United States Patent
Yano et al.

(10) Patent No.: US 9,825,423 B2
(45) Date of Patent: Nov. 21, 2017

(54) LASER-FREQUENCY STABILIZER AND LASER-FREQUENCY STABILIZATION METHOD

(71) Applicant: MITUTOYO CORPORATION, Kanagawa (JP)

(72) Inventors: Ryunosuke Yano, Miyazaki (JP); Yusuke Shirakawa, Kanagawa (JP); Tatsuya Narumi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/042,627

(22) Filed: Feb. 12, 2016

(65) Prior Publication Data
US 2016/0240998 A1    Aug. 18, 2016

(30) Foreign Application Priority Data
Feb. 17, 2015 (JP) .................... 2015-028657

(51) Int. Cl.
*H01S 3/13* (2006.01)
*H01S 3/139* (2006.01)

(52) U.S. Cl.
CPC .......... *H01S 3/1305* (2013.01); *H01S 3/1392* (2013.01)

(58) Field of Classification Search
CPC ............... H01S 3/1305; H01S 3/08072; H01S 3/09705; H01S 3/13; H01S 3/1301; H01S 3/1302; H01S 3/1303; H01S 3/1304; H01S 3/1308; H01S 3/1312; H01S 3/134; H01S 3/137; H01S 5/0623; H01S 5/068; H01S 5/0264; H01S 5/06808; H01S 5/0427; H01S 5/0428; H01S 5/06812; H01S 5/02453; H01S 5/06804; H01S 5/06817; H01S 5/06825; H01S 5/0683; H01S 5/0687

USPC .......... 372/29.01, 29.011, 29.015, 29.02, 32
See application file for complete search history.

(56) References Cited

U.S. PATENT DOCUMENTS

| | | | |
|---|---|---|---|
| 7,773,644 B2 | 8/2010 | Oozeki | |
| 7,835,411 B2 | 11/2010 | Masuda et al. | |
| 8,958,446 B2 | 2/2015 | Hirose | |
| 9,231,364 B2 | 1/2016 | Yano | |
| 2008/0130694 A1* | 6/2008 | Nakagawa | H01S 3/1392 372/32 |

(Continued)

FOREIGN PATENT DOCUMENTS

JP    2013-016713 A    1/2013

OTHER PUBLICATIONS

JP2013-016713 (English translation).*

*Primary Examiner* — Jessica Manno
*Assistant Examiner* — Delma R Forde
(74) *Attorney, Agent, or Firm* — Greenblum & Bernstein, P.L.C.

(57) ABSTRACT

A laser-frequency stabilizer includes: a light detector that converts a laser beam passing through an iodine cell to an optical output signal, an actuator that changes a resonator length in accordance with a received output voltage, and a control unit that controls the output voltage applied to the actuator. The control unit searches for a target saturated absorption line based on the optical output signal and, when the output voltage when the target saturated absorption line is found is within a normal voltage range that is predetermined corresponding to the target saturated absorption line, locks a oscillation frequency of the laser beam to the target saturated absorption line.

4 Claims, 7 Drawing Sheets

(56) References Cited

U.S. PATENT DOCUMENTS

2013/0195132 A1* 8/2013 Yano .................. H01S 3/1305
372/32
2014/0328359 A1* 11/2014 Yano .................. H01S 3/1392
372/29.011

* cited by examiner

LASER-FREQUENCY STABILIZER AND LASER-FREQUENCY STABILIZATION METHOD

CLAIM FOR PRIORITY

This application claim priority benefit of Japanese Patent Application 2015-028657, filed Feb. 17, 2015, the contents of which is expressly incorporated by reference herein in its entirety.

TECHNICAL FIELD

The present invention relates to a laser-frequency stabilizer and a laser-frequency stabilization method.

BACKGROUND ART

A typically known laser-frequency stabilizer is adapted to change a resonator length thereof based on a saturated absorption line included in an optical output signal obtained by irradiating an absorption cell with a laser beam to stabilize an oscillation frequency of the laser beam to a specific saturated absorption line (see, for instance, Patent Literature 1: JP-A-2013-16713).

FIG. 5 is a block diagram showing a typical laser-frequency stabilizer 100.

As shown in FIG. 5, the laser-frequency stabilizer 100 includes a laser generator 10, a laser-beam detector 20 and a drive control unit 30.

The laser generator 10 includes an excitation semiconductor laser 11 configured to emit a laser beam L1 of 808 nm wavelength, and a resonant-wave generator 12 configured to receive the laser beam L1 and output a laser beam L2 of 532 nm wavelength.

The resonant-wave generator 12 includes optical components such as Nd:YVO4 crystal 121 configured to emit a light of 1064 nm wavelength by stimulated emission, a KTP crystal (non-linear optical crystal) 122 configured to convert a part of the light of 1064 nm wavelength into a light of 532 nm wavelength, an etalon 123 configured to transmit only a specific frequency of the laser beam, and a reflection mirror 124 configured to reflect the light of 1064 nm wavelength and transmit the light of 532 nm wavelength, and a resonator casing 125 housing the optical components.

The etalon 123 disposed in the resonator casing 125 provides the laser beam L2 in a single-mode.

Further, an actuator 126 (e.g. piezoelectric element) configured to change the position of the reflection mirror 124 (i.e. change the resonator length) in accordance with the applied voltage is disposed inside the resonator casing 125.

In the laser-beam detector 20, the laser beam L2 transmitted through a λ/2 plate 21 is divided by a first polarization beam splitter 22 into a laser beam L3 used for length measurement and the like and a laser beam L4 used in below-described saturated absorption line search process (referred to as a "search process" hereinafter) and a laser beam oscillation frequency locking process (referred to as a "frequency locking process" hereinafter).

Further, in the laser-beam detector 20, after the laser beam L4 passes through a second polarization beam splitter 23, a quarter-wave plate 24, and an iodine cell (absorption cell) 25, the laser beam L4 is reflected by the reflection mirror 26 toward the iodine cell 25.

Furthermore, in the laser-beam detector 20, after passing through the iodine cell 25 and the quarter-wave plate 24, the laser beam L4 is reflected by the second polarization beam splitter 23 toward a light detector 27 (converter), at which the laser beam L4 is photoelectrically converted to output an optical output signal S1.

FIGS. 6A and 6B show the optical output signal S1 and a secondary differentiation signal S2.

It should be noted that an ordinate axis in FIG. 6A represents output values of the signals S1, S2 and abscissa axis represents an output voltage V to the actuator 126, thereby showing the waveforms of the signals S1, S2 in accordance with the change in the output voltage V (i.e. in accordance with the change in the resonator length). FIG. 6B shows the secondary differentiation signal S2 in an area Ar of FIG. 6A in an enlarged manner.

As shown in FIG. 6A, when the output voltage V is varied over a wide range, it is understood that absorption lines M1 to M4 (referred to as peak groups M1 to M4 for the convenience of description hereinafter) periodically appear. It should be noted that the peak group M1 is the same peak group as the peak group M3, and the peak group M2 is the same peak group as the peak group M4.

The peak groups M1 to M4 are bundles of saturated-absorption-line groups. For instance, as shown in FIG. 6B, the peak group M2 is provided by (in an ascending order of the output voltage V) a saturated-absorption-line group N1 (a saturated absorption line a1), a saturated-absorption-line group N2 (saturated absorption lines a2 to a5), a saturated-absorption-line group N3 (saturated absorption lines a6 to a9), a saturated-absorption-line group N4 (a saturated absorption line a10), a saturated-absorption-line group N5 (saturated absorption lines a11 to a14), and a saturated-absorption-line group N6 (a saturated absorption line a15).

The drive control unit 30 controls an operation of the actuator 126 based on the optical output signal S1 (i.e. adjust the resonator length) to stabilize the oscillation frequency to a specific one of the saturated absorption lines.

Specifically, the drive control unit 30 includes an actuator controller 32 configured to control an actuator drive circuit 33 based on a control signal of the control unit 31 (i.e. adjust a voltage value V' outputted to the actuator drive circuit 33) to change the output voltage V to the actuator 126.

It should be noted that the drive control unit 30 includes modulation/demodulation signal generator 34 configured to output signals of frequencies 1f, 2f and 3f Hz, a secondary differentiation lock-in amplifier 35 and third differentiation lock-in amplifier 36 (generators) configured to modulate the optical output signal S1 obtained by excitation of the laser beam L2 modulated by the actuator drive circuit 33 based on the signal of 1f Hz frequency using the frequencies 2f and 3f Hz to generate the secondary differentiation signal S2 and the third differentiation signal S3 respectively in addition to the above-described actuator controller 32, the actuator drive circuit 33 and the control unit 31.

The control unit 31 once measures a saturated absorption line (i.e. measures the number of the saturated-absorption-line groups belonging to each of the peak groups M1 to M4 and the number of the saturated absorption line(s) belonging to each of the saturated-absorption-line groups) in the search process, and again measures the saturated absorption line in the frequency locking process to lock the oscillation frequency to a desired one of the saturated absorption lines.

Herein, when the control unit 31 identifies the saturated absorption lines, the control unit 31 determines the saturated absorption lines after removing noise components based on the optical output signal S1 and the secondary differentiation signal S2 of the optical output signal S1 (see Patent Literature 1). With the above arrangement, even when there is an originally non-observable peak (noise) between the peak groups, between the saturated-absorption-line groups in the same peak group or between the saturated absorption lines in the same saturated-absorption-line group, the noise is not identified to be the saturated absorption line and the laser oscillation frequency can be locked to the desired one of (i.e. target) saturated absorption lines.

In order to check whether or not a laser beam of a desired laser oscillation frequency is outputted in the above-described typical laser-frequency stabilizer 100, a check process has to be conducted using a system as shown in FIG. 7 after the frequency locking process of the control unit 31.

FIG. 7 shows an outline of a system arrangement for checking the oscillation frequency of the laser beam.

As shown in FIG. 7, a reference-laser-beam source 200 configured to output a reference laser beam L5 having a known oscillation frequency is provided independently of the laser-frequency stabilizer 100.

Then, the optical axes of the reference laser beam L5 and the laser beam L3 outputted from the laser-frequency stabilizer 100 are coaxially arranged using, for instance, an optical axis adjustment reflector mirror 201 and a beam splitter 202 as shown in FIG. 7 before the reference laser beam L5 and the laser beam L3 are incident on the high-speed light detector 203. In the high-speed light detector 203, a frequency difference (beat frequency) between the laser beam L3 and the reference laser beam L5 is detected, and the beat frequency is measured using a frequency counter 204 based on beat signals outputted by the high-speed light detector 203. By determining whether or not the measured beat frequency is the same as the frequency difference between a target frequency and the frequency of the reference laser beam L5, it can be determined whether or not the laser beam L3 outputted from the laser-frequency stabilizer 100 is the laser beam of the desired oscillation frequency.

However, in order to provide the system shown in FIG. 7, the reference-laser-beam source 200, the high-speed light detector 203 and the frequency counter 204 for measuring the beat frequency, and the optical axis adjustment reflector mirror 201 and the beam splitter 202 for coaxially arranging the optical axes of the laser beam L3 and the reference laser beam L5 are required, thereby complicating the system arrangement and increasing the system cost.

SUMMARY OF THE INVENTION

An object of the invention is to provide a laser-frequency stabilizer capable of easily checking with a simple structure whether or not a laser beam of a predetermined oscillation frequency is outputted, and a laser-frequency stabilization method.

A laser-frequency stabilizer according to an aspect of the invention is configured to change a resonator length based on a saturated absorption line included in an optical output signal obtained by irradiating an absorption cell with a laser beam to stabilize the oscillation frequency of the laser beam to a specific saturated absorption line, the laser-frequency stabilizer including: a converter configured to convert the laser beam having passed through the absorption cell into the optical output signal; an actuator configured to change the resonator length in accordance with a voltage applied to the actuator; and a control unit configured to control the voltage applied to the actuator, in which the control unit is configured to search for a target saturated absorption line based on the optical output signal and when the voltage applied to the actuator when the target saturated absorption line is found is within a predetermined range defined corresponding to the target saturated absorption line, lock the oscillation frequency of the laser beam at the target saturated absorption line.

In the above aspect of the invention, after the target saturated absorption line (i.e. a saturated absorption line corresponding to a desired oscillation frequency of the laser beam) is found based on the optical output signal, whether or not the voltage at which the target saturated absorption line is found is within the predetermined range defined corresponding to the target saturated absorption line is judged before the oscillation frequency of the laser beam is locked to the saturated absorption line.

When the output voltage applied to the actuator when the target saturated absorption line is found is not within the predetermined range, it is possible that the found saturated absorption line is not the target saturated absorption line and thus the oscillation frequency of the outputted laser beam is out of the desired laser frequency. On the other hand, since the oscillation frequency of the laser beam is locked to the target saturated absorption line only when the output voltage applied to the actuator when the target saturated absorption line is found is within the predetermined range, the laser beam of the desired oscillation frequency can be stably outputted.

In other words, without requiring an independent reference-laser-beam source for outputting a reference laser beam and observing the beat frequencies of the laser beam outputted from the laser frequency stabilizer and the reference laser beam, whether or not the laser beam of the desired oscillation frequency is outputted can be easily determined with a simple arrangement.

In the laser stabilizer according to the above aspect of the invention, it is preferable that the predetermined range is defined by including a margin corresponding to a variation in the resonator length to the voltage at which the oscillation frequency of the laser beam is locked at the target saturated absorption line.

In the above arrangement, the predetermined range is defined including the margin corresponding to the variation of the resonator length. Specifically, the voltage applied to the actuator entails some variations being influenced by the change in the resonator length (e.g. temporal change of the actuator). If the predetermined range of the voltage corresponding to the target saturated absorption line is defined without taking the above variations into consideration, even when a laser beam of a predetermined oscillation frequency is outputted, it is judged that the oscillation frequency differs (i.e. occurrence of an error is judged) if the resonator length changes due to the temporal change and the like. In contrast, since the predetermined range is defined considering the variations in the voltage due to the change in the resonator length in the above arrangement, even when the resonator length changes, the error judgment can be avoided and the laser beam of the desired oscillation frequency can be stably outputted.

A laser-frequency stabilization method according to another aspect of the invention is for a laser-frequency stabilizer configured to change a resonator length based on a saturated absorption line included in an optical output signal obtained by irradiating an absorption cell with a laser beam to stabilize the oscillation frequency of the laser beam to a specific saturated absorption line, the laser-frequency stabilization method including: searching for a target saturated absorption line based on the optical output signal; judging whether or not a voltage outputted to an actuator configured to change the resonator length when the target saturated absorption line is found is within a predetermined range defined corresponding to the target saturated absorption line; and when it is judged that the voltage is within the predetermined range, locking the oscillation frequency of the laser beam to the target saturated absorption line.

In the above aspect of the invention, an arrangement (e.g. a reference-laser-beam source) for checking whether or not the laser beam outputted by the laser-frequency stabilizer has the desired oscillation frequency is not necessary as in the first aspect of the invention, so that the oscillation frequency of the laser beam can be easily checked with a simple arrangement.

BRIEF DESCRIPTION OF DRAWING(S)

DESCRIPTION OF EMBODIMENT(S)

Exemplary embodiment(s) of the invention will be described below with reference to the attached drawings.

Arrangement of Laser-Frequency Stabilizer

Figure 1:
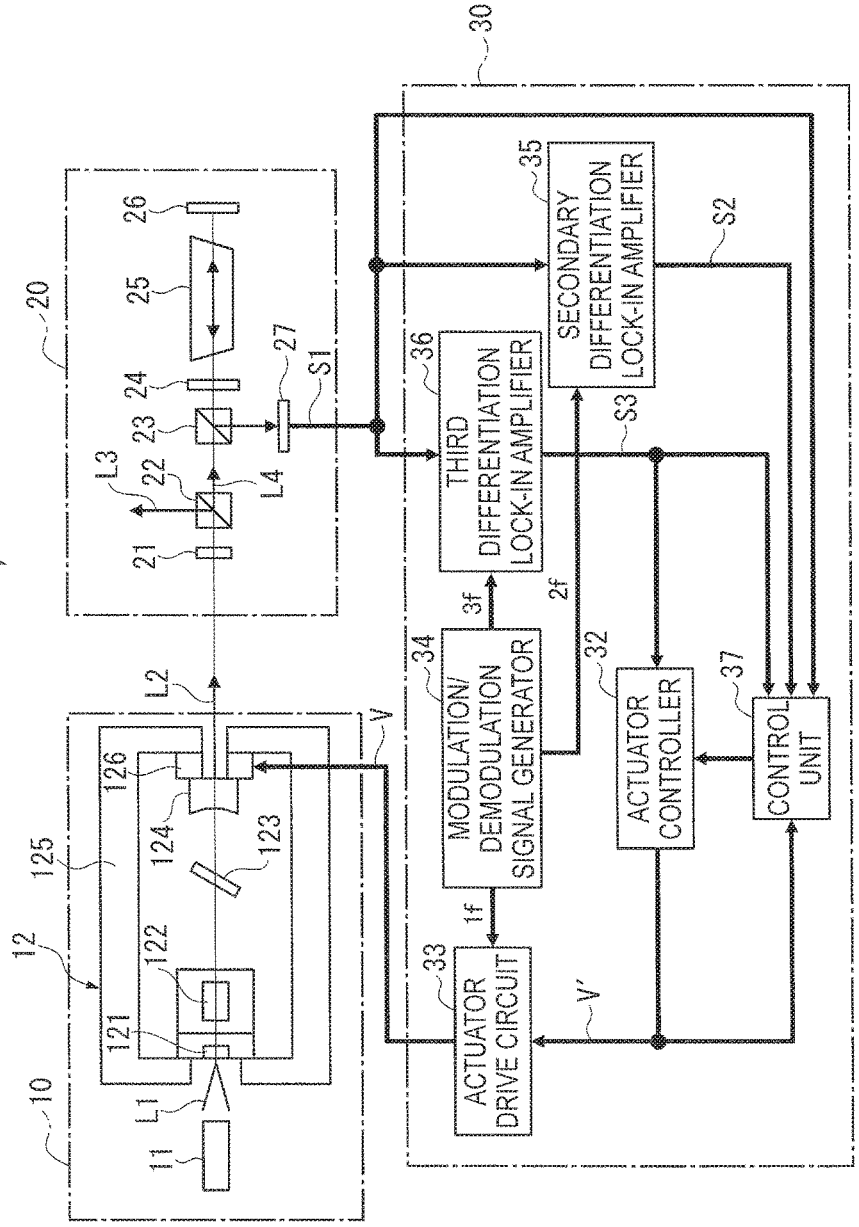
FIG. 1 is a block diagram showing a laser-frequency stabilizer according to an exemplary embodiment of the invention.

FIG. 1 is a block diagram showing a laser-frequency stabilizer 1 according to a first exemplary embodiment.

As shown in FIG. 1, the laser-frequency stabilizer 1 includes a laser generator 10, a laser-beam detector 20 and a drive control unit 30 similar to those of the typical laser-frequency stabilizer 100.

It should be noted that the laser-frequency stabilizer 1 of the exemplary embodiment differs from the above typical laser-frequency stabilizer 100 in that a control unit 37 performs the search process and the frequency locking process and the control unit 37 self-checks whether or not a oscillation frequency of a laser beam is the same as a desired oscillation frequency (target frequency) prior to the frequency locking process.

Accordingly, the same reference numeral(s) will be attached to the same functions and components as those of the typical laser-frequency stabilizer 100 to omit or simplify the explanation thereof, and the function(s) of the control unit 37 will be described in detail below.

Arrangement of Control Unit

Figure 2:
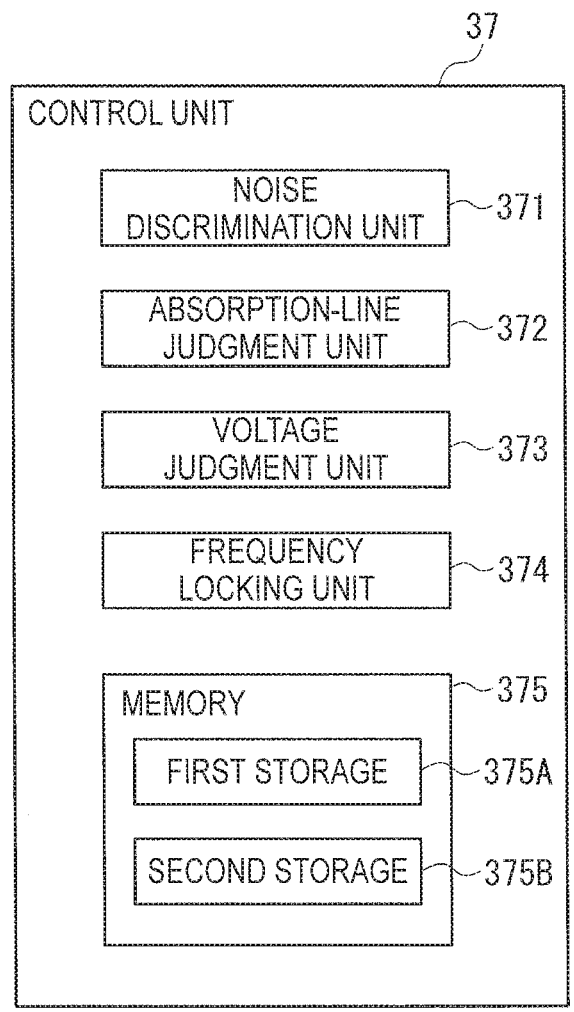
FIG. 2 is a block diagram showing a control unit of the exemplary embodiment.

FIG. 2 is a block diagram showing the control unit 37.

The control unit 37 includes a CPU (Central Processing Unit), a memory 375 and the like and performs various processes in accordance with program(s) stored in the memory 375. It should be noted that the same functions of the control unit 37 as those of the typical control unit 31 will be omitted or simplified.

As shown in FIG. 1 or FIG. 2, the control unit 37 includes a noise discrimination unit 371, an absorption-line judgment unit 372, a voltage judgment unit 373, a frequency locking unit 374, the memory 375 and the like.

The noise discrimination unit 371 discriminates the noise superposed on the optical output signal S1.

The absorption-line judgment unit 372 judges the saturated absorption line based on the discrimination results of the noise discrimination unit 371.

The noise discrimination process by the noise discrimination unit 371 and the determination process of the saturated absorption line by the absorption-line judgment unit 372 may be performed, for instance, using various processes disclosed in JP-A-2013-16713.

For instance, the noise discrimination unit 371 may compare the secondary differentiation signal S2 from the secondary differentiation lock-in amplifier 35 with a first threshold and compare an output value of the optical output signal S1 from the light detector 27 with a second threshold, and may discriminate the noise based on the results of the comparisons.

Alternatively, the noise discrimination unit 371 may compare the output value of the secondary differentiation signal S2 from the secondary differentiation lock-in amplifier 35 with third and fourth thresholds, which are respectively smaller than and larger than the output value of the secondary differentiation signal S2, to discriminate the noise based on the behavior of the output waveform of the secondary differentiation signal S2 when the output voltage V changes.

Further alternatively, the noise discrimination unit 371 may compare the output value of the secondary differentiation signal S2 with a fifth threshold, and may store in the memory 375 information in which the results of the comparison, the output value of the secondary differentiation signal S2, and the voltage value of the output voltage V applied when the secondary differentiation signal S2 is inputted are associated. Then, based on the stored information, the noise discrimination unit 371 may calculate differences between the voltage values of the output voltage V applied when the output values of the secondary differentiation signal S2 reach a predetermined value and compare the differences with a sixth threshold to discriminate the noise.

The voltage judgment unit 373 judges whether or not the output voltage V applied when a target saturated absorption line at which the oscillation frequency of the laser beam is to be locked is found is within a normal voltage range R (see FIG. 4B; lower limit V_lower, upper limit V_upper) defined for the target saturated absorption line. The normal voltage range R is defined for each of the saturated absorption lines and is stored in the memory 375.

The normal voltage range R is defined considering variations of the output voltage V. Specifically, the output voltage V for adjusting the oscillation frequency of the laser beam to the predetermined target saturated absorption line is not constant since being influenced by the change in the resonator length (e.g. a temporal change of the actuator 126). Accordingly, the lower limit V_lower and the upper limit V_upper of the normal voltage range R are defined at values including margins in consideration of the above variations. For instance, when the output voltage V applied when the oscillation frequency of the laser beam is locked at the frequency of the predetermined target saturated absorption line is in a range from 7.0 to 9.0 V, the normal voltage range R is defined including the lower limit V_lower=6.8 V and the upper limit V_upper=9.2 V.

The frequency locking unit 374 performs a frequency locking process for locking the output voltage V in accordance with the determination result of the voltage judgment unit 373.

Operation of Laser-Frequency Stabilizer

Next, operations of the above-described laser-frequency stabilizer 1 will be described below.

Figure 3:
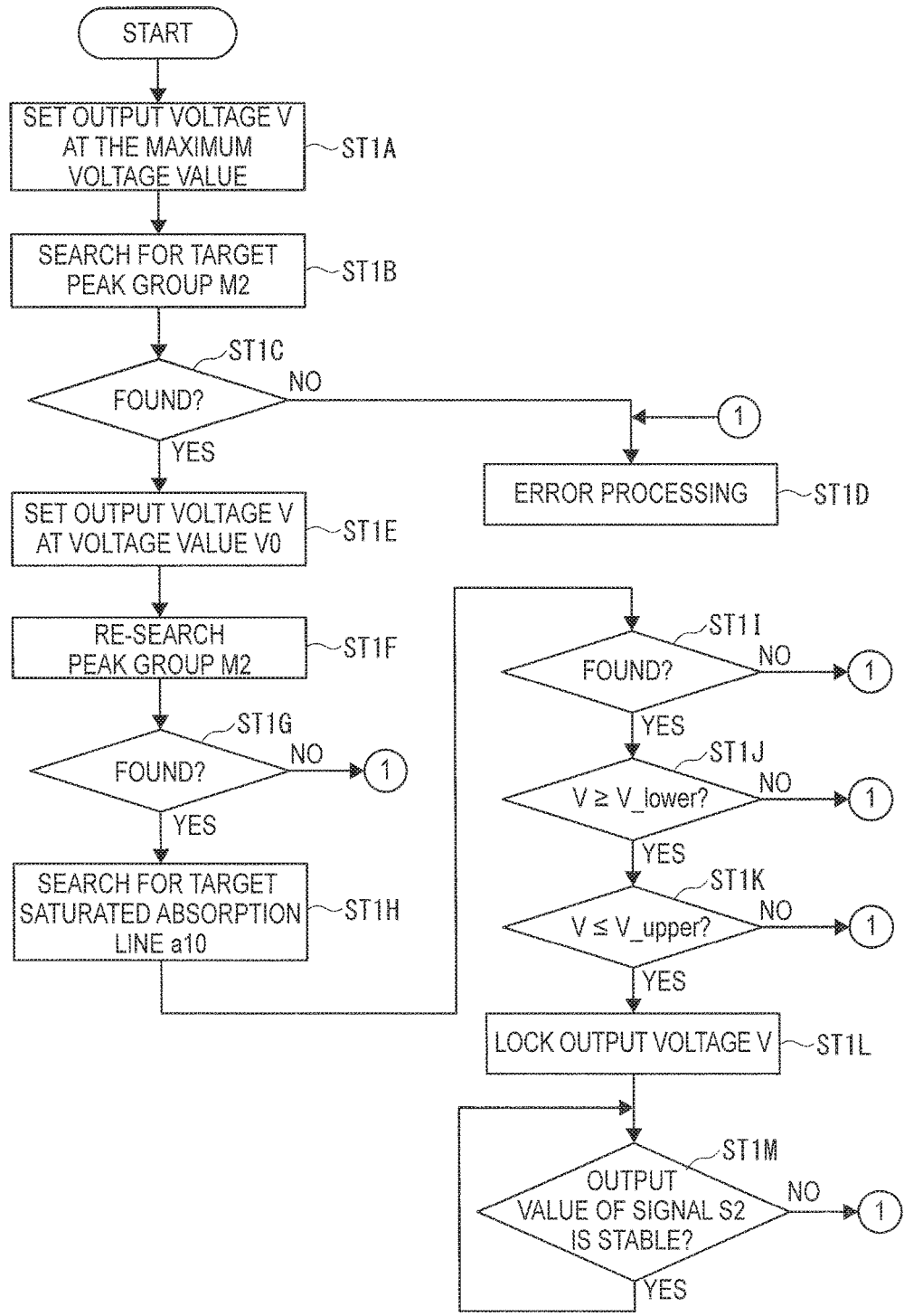
FIG. 3 is a flowchart showing a search process and a frequency locking process in the exemplary embodiment.
Figure 4A:
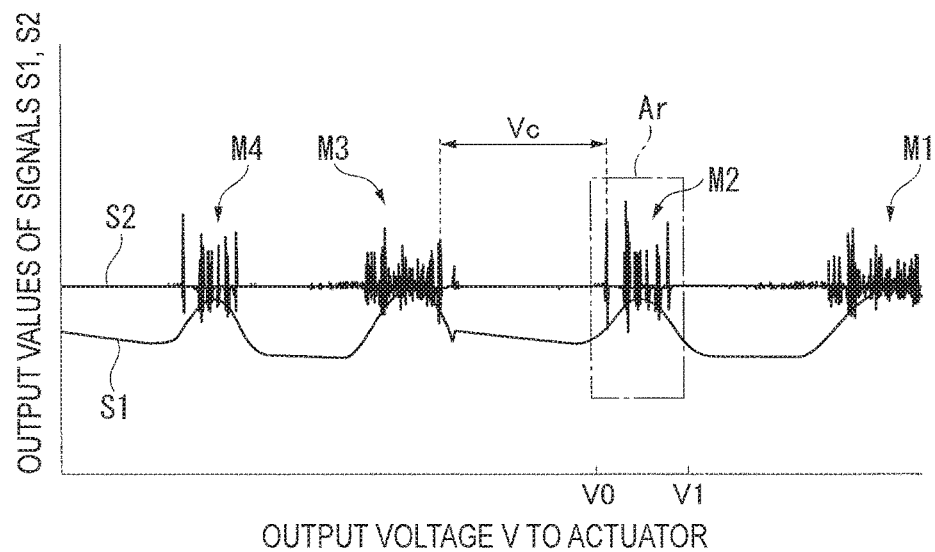
FIG. 4A illustrates an optical output signal, a secondary differentiation signal, and a normal voltage range in the exemplary embodiment.
Figure 4B:
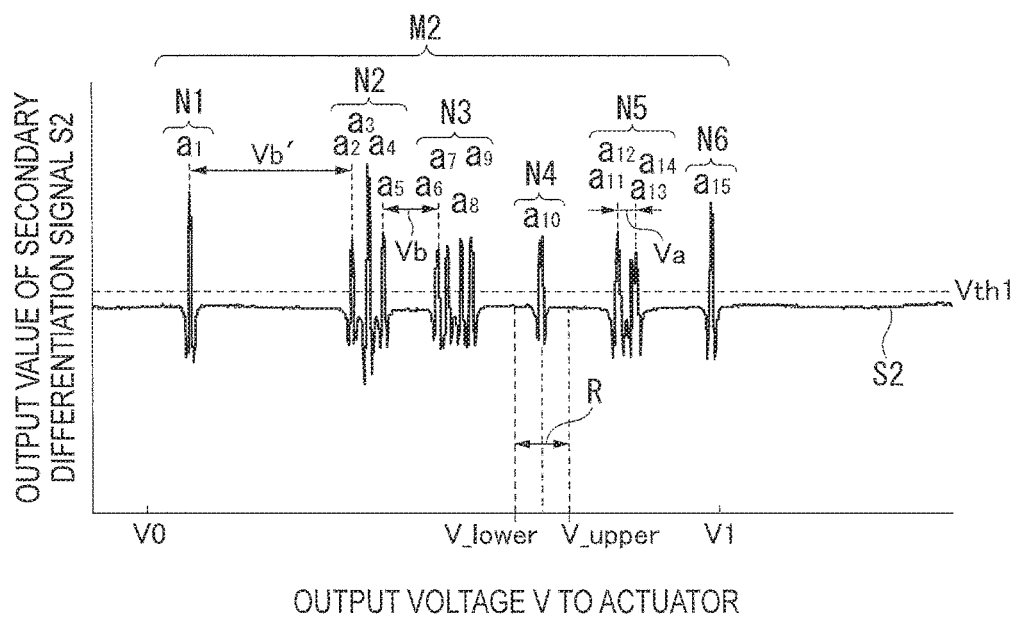
FIG. 4B illustrates the optical output signal, the secondary differentiation signal, and the normal voltage range in the exemplary embodiment.
Figure 5:
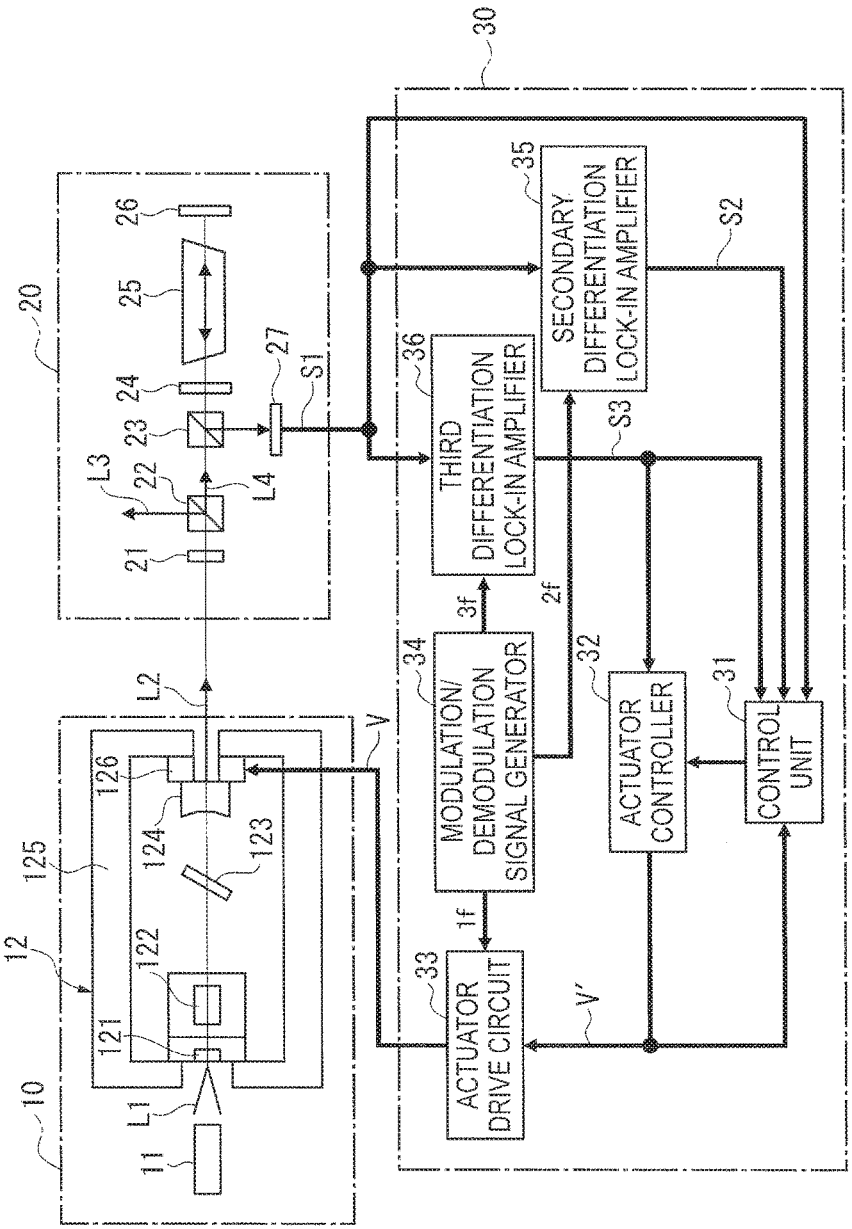
FIG. 5 is a block diagram showing a typical laser-frequency stabilizer.
Figure 6A:
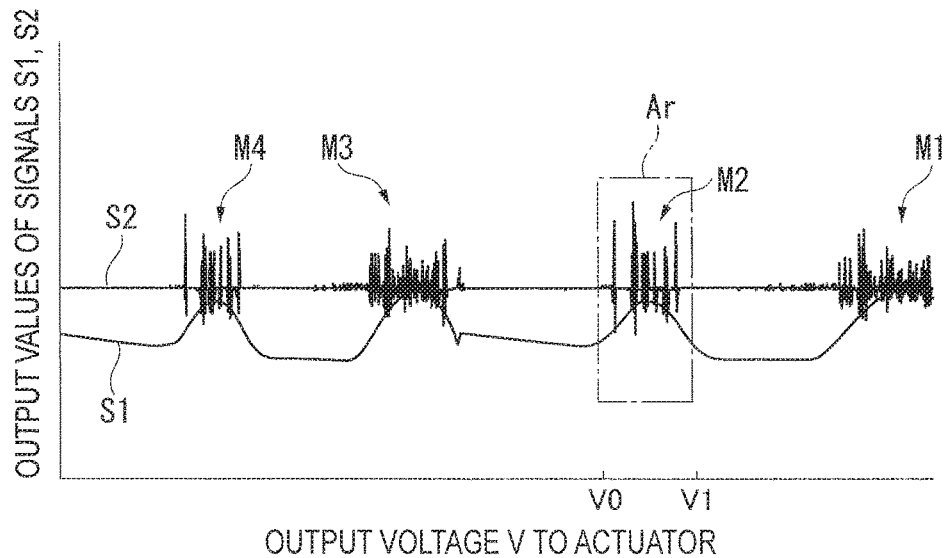
FIG. 6A illustrates the optical output signal and the secondary differentiation signal.
Figure 6B:
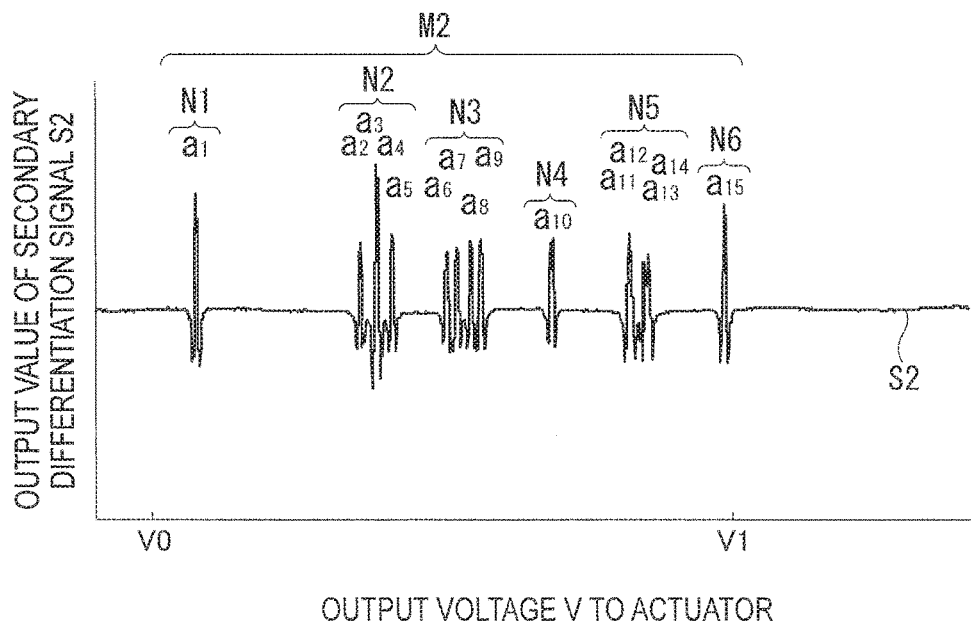
FIG. 6B illustrates the optical output signal and the secondary differentiation signal.
Figure 7:
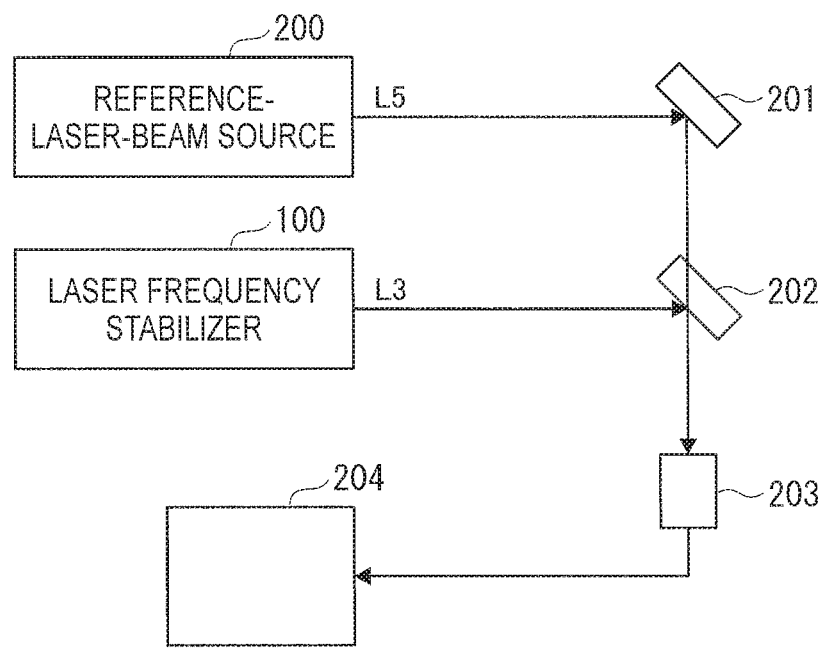
FIG. 7 shows a system for checking the oscillation frequency of the laser beam of the typical laser-frequency stabilizer.

FIG. 3 is a flowchart for explaining the laser-frequency stabilization method (the search process and frequency locking process) using the laser-frequency stabilizer. FIGS. 4A and 4B show the optical output signal S1, the secondary differentiation signal S2, and the normal voltage range R. It should be noted that an ordinate axis in FIG. 4A represents the output values of the signals S1, S2 and an abscissa axis represents the output voltage V to the actuator 126, thereby showing the waveforms of the signals S1, S2 in accordance with the change in the output voltage V. FIG. 4B shows the secondary differentiation signal S2 in an area Ar of FIG. 4A in an enlarged manner.

It should be noted that the explanation of the substantially same steps as those of the search process and frequency locking process performed in the typical laser-frequency stabilizer 100 will be simplified in the explanation of the search process and frequency locking process in this exemplary embodiment.

It should also noted that, for the sake of the convenience of explanation, the target saturated absorption line is set to be the saturated absorption line a10 (the saturated-absorption-line group and the peak group to which the saturated absorption line a10 belongs are respectively N4 and M2).

Initially, the control unit 37 controls the operation of the actuator drive circuit 33 to set the output voltage V applied to the actuator 126 at the maximum voltage value (Step ST1A).

After the Step ST1A, the control unit 37 searches the target peak group M2 while gradually decreasing the output voltage V from the maximum voltage value to the minimum voltage value (Step ST1B).

In the Step ST1B, the control unit 37 performs the following processes.

Specifically, the control unit 37 removes the noise using the noise discrimination unit 371 and the absorption-line judgment unit 372 to judge solely the saturated absorption lines removing the noise (saturated absorption line judgment process), and stores the voltage values of the output voltage V applied to the actuator 126 when the saturated absorption lines are found in a first storage 375A of the memory 375 (FIG. 2).

More specifically, the noise discrimination unit 371 compares, for instance, the output value of the secondary differentiation signal S2 with the first threshold to constantly monitor whether or not the output value of the secondary differentiation signal S2 reaches or exceeds the first threshold. Then, when the output value of the secondary differentiation signal S2 reaches or exceeds the first threshold, the control unit 37 stores in a second storage 375B (FIG. 2) of the memory 375 the voltage value of the output voltage V applied to the actuator 126 when the output value of the secondary differentiation signal S2 reaches or exceeds the first threshold.

At this time, the noise discrimination unit 371 also compares the output value of the optical output signal S1 with the second threshold to judge whether or not the output value of the optical output signal S1 reaches or exceeds the second threshold. When the noise discrimination unit 371 judges that the output value of the optical output signal S1 reaches or exceeds the second threshold, the absorption-line judgment unit 372 judges that the secondary differentiation signal S2 whose output value reaches or exceeds the first threshold is the saturated absorption line. At this time, the absorption-line judgment unit 372 stores in the first storage 375A the voltage value of the output voltage V stored in the second storage 375B (i.e. the voltage value of the output voltage V applied to the actuator 126 when the output value of the secondary differentiation signal S2 reaches or exceeds the first threshold) as the voltage value of the output voltage V applied to the actuator 126 when the saturated absorption line is observed, and deletes the voltage value of the output voltage V stored in the second storage 375B.

On the other hand, when the noise discrimination unit 371 judges that the output value of the optical output signal S1 is less than the second threshold, the absorption-line judgment unit 372 judges the secondary differentiation signal S2 whose output value reaches or exceeds the first threshold is not the saturated absorption line but a signal superposed with noise, and deletes the voltage value of the output voltage V stored in the second storage 375B.

It should be noted that the saturated absorption line judgment process by the noise discrimination unit 371 and the absorption-line judgment unit 372 is not limited to the above, but the saturated absorption line may be determined through the noise discrimination based on the output waveform of the secondary differentiation signal S2 as described above.

Subsequently, the control unit 37 retches the voltage values Vnew and Vold from the first storage 375A, calculates a difference between the voltage values Vnew and Vold and compares the difference with $\Delta V$, $\Delta V'$.

In the above, the voltage value Vnew is the voltage value of the output voltage V applied when the saturated absorption line is observed (most recently observed). The voltage value Vold is the voltage value of the output voltage V applied when the saturated absorption line is observed immediately before the saturated absorption line is most recently observed.

$\Delta V$ and $\Delta V'$ are values that satisfy relationships of $Va < \Delta V < Vb$ and $Vb' < \Delta V' < Vc$, where Va represents the maximum value of the differences between the output voltages V of adjacent ones of the saturated absorption lines belonging to each of the saturated-absorption-line groups (see FIG. 4B), Vb and Vb' respectively represent the minimum and maximum values of the differences between the output voltages V of the adjacent ones of the saturated absorption line groups (see FIG. 4B), and Vc represents the minimum value of the differences of the output voltages V of each of the peak groups (FIG. 4A).

In other words, the control unit 37 compares the difference between the voltage values Vnew and Vold with $\Delta V$ to judge whether or not the currently measured saturated absorption line and the saturated absorption line measured immediately before belong to the same saturated-absorption-line group.

Further, the control unit 37 compares the difference between the voltage values Vnew and Vold with $\Delta V'$ to judge whether or not the currently measured saturated absorption line and the saturated absorption line measured immediately before belong to the same peak group.

In the description below, the above process for judging the saturated absorption line belongs to which one of the saturated-absorption-line groups and which one of the peak groups will be referred to as an absorption-line judgment process.

In the absorption-line judgment process, the control unit 37 searches for the peak group M2 having six saturated-absorption-line groups (N1 to N6) respectively having one (a1), four (a2 to a5), four (a6 to a9), one (a10), four (a11 to a14) and one (a15) saturated absorption lines in an ascending order of the output voltage V.

Then, after decreasing the output voltage V from the maximum voltage value to the minimum voltage value, the control unit 37 judges whether or not the target peak group M2 is found (Step ST1C).

If the judgment result in the Step ST1C is "NO", the control unit 37 performs an error processing (Step ST1D).

The error processing herein is exemplified by flashing of an LED (Light Emitting Diode) or notification by sound for notifying an operator of the occurrence of an error.

On the other hand, when the judgment result in the Step ST1C is "Yes", the control unit 37 sets the output voltage V to a voltage value V0 (FIGS. 4A and 4B) slightly smaller than the voltage value at which the saturated absorption line a1 in the saturated-absorption-line groups N1 to N6 belonging to the peak group M2 is observable (Step ST1E).

After the Step ST1E, the control unit 37 in searches the target peak group M2 while gradually increasing the output voltage V from the voltage value V0 (Step ST1F) in the same manner as the Step ST1B.

Then, the control unit 37 judges whether or not the peak group M2 is found as a result of the increase in the output voltage V (Step ST1G).

If the judgment result in the Step ST1G is "NO", the control unit 37 performs the error processing in the Step ST1D.

On the other hand, when the judgment result in the Step ST1G is "YES", the control unit 37 searches for the target saturated absorption line a10 as described below (Step ST1H: search step).

Initially, while performing the saturated absorption-line judgment process and the absorption line determination process by the noise discrimination unit 371 and the absorption-line judgment unit 372, the control unit 37 decreases the output voltage V until a third saturated-absorption-line group is observed in the firstly observed peak group.

It should be noted that the output voltage V after the peak group M2 is searched again in the Step ST1F is a voltage value V1 (FIGS. 4A and 4B) that is slightly larger than the voltage value at which the saturated absorption line a15 is observed. Accordingly, the above "firstly observed" peak group is the peak group M2. Further, the saturated-absorption-line group that is firstly observed in the saturated-absorption-line groups belonging to the peak group M2 is the saturated-absorption-line group N6 and the saturated-absorption-line group that is thirdly observed is the saturated-absorption-line group N4.

Next, while performing the saturated absorption-line judgment process and the absorption line determination process by the noise discrimination unit 371 and the absorption-line judgment unit 372, the control unit 37 decreases the output voltage V until a saturated-absorption-line belonging to the thirdly observed saturated-absorption-line group N4 is observed once.

It should be noted that, since only one saturated absorption line belongs to the saturated-absorption-line group N4, the firstly observed saturated absorption line is the target saturated absorption line. However, in a saturated-absorption-line group having a plurality of the saturated absorption lines, the target saturated absorption line is identified in a descending order of the output voltage V. For instance, when the saturated absorption line a4 of the saturated-absorption-line group N2 is the target saturated absorption line, the firstly observed saturated absorption line is the saturated absorption line a5 and the secondly observed saturated absorption line is the saturated absorption line a4.

Then, the control unit 37 judges whether or not the saturated absorption line a10 is found as a result of the search step in the Step ST (Step ST1I).

If the judgment result in the Step ST1I is "NO", the control unit 37 performs the error processing in the Step ST1D.

On the other hand, when the judgment result in the Step ST1I is "Yes", the voltage judgment unit 373 judges whether or not the output voltage V at which the target saturated absorption line a10 is observed is at or more than the lower limit V_lower of the normal voltage range R (Step ST1J; voltage judgment step).

If the judgment result in the Step ST1J is "NO", the control unit 37 performs the error processing in the Step ST1D.

When the judgment result in the Step ST1J is "Yes", the voltage judgment unit 373 judges whether or not the output voltage V at which the target saturated absorption line a10 is observed is at or less than the upper limit V_upper of the normal voltage range R (Step ST1K; voltage judgment step).

In other words, the voltage judgment unit 373 judges whether or not the output voltage V at which the target saturated absorption line a10 is observed is within the normal voltage range R (i.e. a nominal range of the output voltage when the laser beam of the target (desired) oscillation frequency is outputted).

If the judgment result by the voltage judgment unit 373 in the Step ST1K is "NO", the control unit 37 performs the error processing in the Step ST1D.

If the judgment result by the voltage judgment unit 373 in the Step ST1K is "YES", the frequency locking unit 374 locks the output voltage V to the voltage value at which the saturated absorption line a10 is observed (Step ST1L; frequency locking step).

Thus, the oscillation frequency of the laser beam L2 coincides with the target saturated absorption line a10 through the process in the Step ST1L.

Further, after the Step ST1L, the control unit 37 compares the output value of the secondary differentiation signal S2 from the secondary differentiation lock-in amplifier 35 with the first threshold Vth1 (see FIG. 4B) to constantly monitor whether or not the output value of the secondary differentiation signal S2 is stably at or more than the first threshold (Step ST1M).

In other words, the control unit 37 monitors whether or not the oscillation frequency of the laser beam L2 is stabilized at the target saturated absorption line a10 in the process of the Step ST1M.

If the judgment result in the Step ST1M is "NO", the control unit 37 performs the error processing in the Step ST1D.

Advantage(s) of Exemplary Embodiment(s)

In the exemplary embodiment, after the target saturated absorption line is found, the control unit 37 judges whether or not the output voltage V at which the target saturated absorption line is observed is within the normal voltage range R that is defined for each of the saturated absorption lines. When the output voltage V is within the normal voltage range R, the control unit 37 locks the output voltage V at which the target saturated absorption line is observed to lock the oscillation frequency of the laser beam at the target saturated absorption line.

Accordingly, it is possible to self-check whether or not the oscillation frequency of the outputted laser beam coincides with the desired laser frequency, so that the oscillation wavelength of the laser beam can be brought into conformity with the desired target frequency with high accuracy. Further, without requiring an independent reference-laser-beam source and the like for outputting a reference laser beam, whether or not the laser beam of the desired oscillation frequency is outputted can be easily determined with a simple arrangement.

Further, considering the variations in the voltage value of the output voltage V being influenced by the change in the resonator length (e.g. the temporal change of the actuator 126), the lower limit V_lower and the upper limit V_upper of the normal voltage range R are defined so as to include a margin corresponding to the variations.

Accordingly, even when the resonator length changes due to the temporal change in the actuator 126 and the like to cause variations in the output voltage V applied when the target saturated absorption line is found, the output voltage V is kept from being judged to be outside the normal voltage range R to be subjected to the error processing. In other words, it is avoidable that the outputted laser beam is subjected to the error process even despite having the desired oscillation frequency.

Modification(s)

Incidentally, it should be understood that the scope of the present invention is not limited to the above-described exemplary embodiment(s) but includes modifications and improvements as long as the modifications and improvements are compatible with the invention.

In the exemplary embodiment, the noise discrimination unit 371 discriminates the noise according to three methods including: a first method in which the output value of the secondary differentiation signal S2 is compared with the first threshold and the output value of the optical output signal S1 is compared with the second threshold to discriminate the noise; a second method in which the secondary differentiation signal S2 is compared with the third and fourth thresholds and the noise is discriminated based on the behavior of the output waveform of the secondary differentiation signal S2 when the output voltage V changes; and a third method in which, based on the result of the comparison between the output value of the secondary differentiation signal S2 and the fifth threshold and the information in which the output value of the secondary differentiation signal S2 is associated with the voltage value of the output voltage V, the difference between the voltage values at which the output value of the secondary differentiation signal S2 becomes a predetermined value is compared with the sixth threshold to discriminate the noise. However, a pair or all of the above methods may be combined to discriminate the noise.

For instance, the first discrimination method may be used in between the peak groups M1 to M4 to determine whether or not the signal represents the saturated absorption line, and the second discrimination method or the third discrimination method may be used in the saturated-absorption-line groups belonging to the same peak group or in between the saturated absorption lines belonging to the same saturated-absorption-line group to find whether or not the signal represents the saturated absorption line.

Though an instance in which a predetermined margin is provided for each of the lower limit V_lower and the upper limit V_upper of the normal voltage range R in consideration of the change in the resonator length in the above exemplary embodiment, the normal voltage range R may be defined to be a range not including the margin. Alternatively, the margin may be defined to only one of the lower limit V_lower and the upper limit V_upper.

What is claimed is:

1. A laser-frequency stabilizer configured to change a resonator length based on a saturated absorption line included in an optical output signal obtained by irradiating an absorption cell with a laser beam to stabilize an oscillation frequency of the laser beam to a specific saturated absorption line, the laser-frequency stabilizer comprising:
a converter configured to convert the laser beam having passed through the absorption cell into the optical output signal;
an actuator configured to change the resonator length in accordance with a voltage applied to the actuator; and
a controller configured to control the voltage applied to the actuator, wherein
the controller comprises a memory storing a normal voltage range that is preset for the saturated absorption line, the controller being configured to search for a target saturated absorption line based on the optical output signal and, when the voltage applied to the actuator, when the target saturated absorption line is found, is within the stored normal voltage range defined as corresponding to the target saturated absorption line, to lock the oscillation frequency of the laser beam at the target saturated absorption line.

2. The laser-frequency stabilizer according to claim 1, wherein
the stored normal voltage range includes a margin corresponding to a variation in the resonator length to the voltage at which the oscillation frequency of the laser beam is locked at the target saturated absorption line.

3. A laser-frequency stabilization method of a laser-frequency stabilizer configured to change a resonator length based on a saturated absorption line included in an optical output signal obtained by irradiating an absorption cell with a laser beam to stabilize an oscillation frequency of the laser beam to a specific saturated absorption line, the laser-frequency stabilization method comprising:
searching for a target saturated absorption line based on the optical output signal;
acquiring a normal voltage range that is preset for a saturated absorption line, the normal voltage range being stored in a memory;
judging whether or not a voltage output to an actuator configured to change the resonator length when the target saturated absorption line is found is within the normal voltage range defined corresponding to the target saturated absorption line; and
when it is judged that the voltage is within the normal voltage range, locking the oscillation frequency of the laser beam to the target saturated absorption line.

4. The laser-frequency stabilization method according to claim 3, wherein
the stored normal voltage range includes a margin corresponding to a variation in the resonator length to the voltage at which the oscillation frequency of the laser beam is locked at the target saturated absorption line.

* * * * *

UNITED STATES PATENT AND TRADEMARK OFFICE
CERTIFICATE OF CORRECTION

PATENT NO. : 9,825,423 B2  
APPLICATION NO. : 15/042627  
DATED : November 21, 2017  
INVENTOR(S) : R. Yano et al.

Page 1 of 1

It is certified that error appears in the above-identified patent and that said Letters Patent is hereby corrected as shown below:

Column 12, Line 52 (Claim 3, Line 14) please change "length when" to -- length, when --

Column 12, Line 53 (Claim 3, Line 15) please change "found is" to -- found, is --

Signed and Sealed this  
First Day of May, 2018

Andrei Iancu  
*Director of the United States Patent and Trademark Office*